(12) United States Patent
Labinski et al.

(10) Patent No.: US 7,513,395 B2
(45) Date of Patent: Apr. 7, 2009

(54) VENTED VALVE

(75) Inventors: Jeffery J. Labinski, Lakewood, OH (US); Michael H. Meyer, Sagamore Hills, OH (US)

(73) Assignee: The Meyer Company, Cleveland, OH (US)

( * ) Notice: Subject to any disclaimer, the term of this patent is extended or adjusted under 35 U.S.C. 154(b) by 595 days.

(21) Appl. No.: 11/087,908

(22) Filed: Mar. 23, 2005

(65) Prior Publication Data

US 2005/0263546 A1 Dec. 1, 2005

Related U.S. Application Data

(60) Provisional application No. 60/655,547, filed on Feb. 23, 2005, provisional application No. 60/591,835, filed on Jul. 28, 2004, provisional application No. 60/555,453, filed on Mar. 23, 2004.

(51) Int. Cl.
*B67D 3/00* (2006.01)
*B65D 25/40* (2006.01)
*F16K 24/00* (2006.01)
*F16K 31/12* (2006.01)

(52) U.S. Cl. ............... 222/481.5; 222/491; 222/568; 251/30.03; 251/112; 137/588

(58) Field of Classification Search ............ 222/481, 222/478, 482, 483, 484, 489, 481.5, 185.1, 222/491, 479; 251/30.03, 112; 137/588, 137/589
See application file for complete search history.

(56) References Cited

U.S. PATENT DOCUMENTS

| 2,197,352 | A |   | 4/1940  | Terkel              |
|-----------|---|---|---------|---------------------|
| 2,661,018 | A | * | 12/1953 | Snyder ....... 137/588 |
| 2,702,563 | A |   | 2/1955  | Snyder et al.       |
| 2,842,291 | A | * | 7/1958  | Duval et al. .... 222/332 |
| 3,401,850 | A |   | 9/1968  | Anderson            |
| 3,405,848 | A |   | 10/1968 | Damrel              |
| 3,606,096 | A |   | 9/1971  | Campbell            |
| 4,452,425 | A |   | 6/1984  | Lucking             |
| 4,471,807 | A |   | 9/1984  | Lucking et al.      |

(Continued)

*Primary Examiner*—Frederick C Nicolas
*Assistant Examiner*—Melvin A Cartagena
(74) *Attorney, Agent, or Firm*—Fay Sharpe LLP

(57) ABSTRACT

A valve includes a body; a liquid flow passage defined in the body and including a liquid inlet and a liquid outlet; a vent passage defined in the body and including an air inlet and an air outlet; a valve seat defined in the liquid flow passage; a liquid seal located adjacent the valve seat; a stem connected to the liquid seal and extending in the liquid flow passage away from the liquid seal through an aperture defined in the body. The stem includes a distal end located external to the body. The stem is movable to and from a first position where the liquid seal is mated with the valve seat and a second position where the liquid seal is unseated from the valve seat. An actuator is connected to the distal end of the stem. The actuator is selectively movable to move the stem from the first position to the second position. A check-valve is adapted to block flow of liquid from the air outlet to the air inlet in the vent passage, and to allow flow of air from the air inlet to the air outlet in said vent passage. The valve optionally further includes a surge control device and/or a keeper for the check-valve seal.

20 Claims, 10 Drawing Sheets

U.S. PATENT DOCUMENTS

| | | |
|---|---|---|
| 4,475,566 A | 10/1984 | Haines |
| 4,687,123 A | 8/1987 | Hyde |
| 4,722,463 A | 2/1988 | Anderson |
| 4,871,096 A | 10/1989 | Horian |
| 4,898,308 A * | 2/1990 | Rudick .................. 222/325 |
| 4,930,689 A | 6/1990 | Stumpf |
| 5,211,313 A | 5/1993 | Lucking et al. |
| 5,337,775 A | 8/1994 | Lane et al. |
| 5,405,058 A | 4/1995 | Kalis et al. |
| 5,769,275 A | 6/1998 | Boehmer et al. |
| 5,992,462 A | 11/1999 | Atkinson et al. |
| 6,155,464 A | 12/2000 | Vachon |
| 6,258,269 B1 | 7/2001 | Knight |
| 6,360,925 B2 * | 3/2002 | Erb ........................... 222/509 |
| 6,364,178 B1 * | 4/2002 | Paczonay ................... 222/522 |
| 6,401,752 B1 | 6/2002 | Blackbourn et al. |
| 6,470,910 B2 | 10/2002 | Blackbourn et al. |
| 6,491,189 B2 | 12/2002 | Friedman |
| 6,648,186 B2 | 11/2003 | Roethel et al. |
| 6,968,983 B2 * | 11/2005 | Laible ................... 222/464.1 |

* cited by examiner

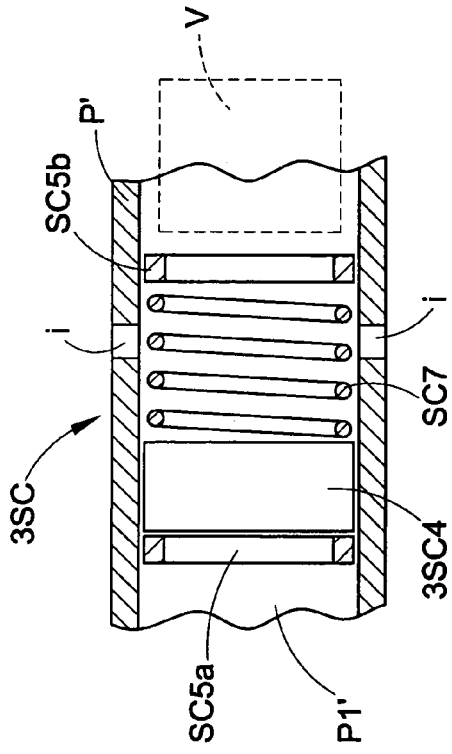
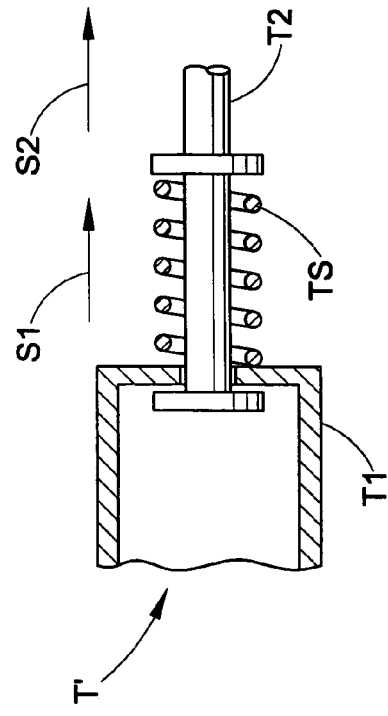
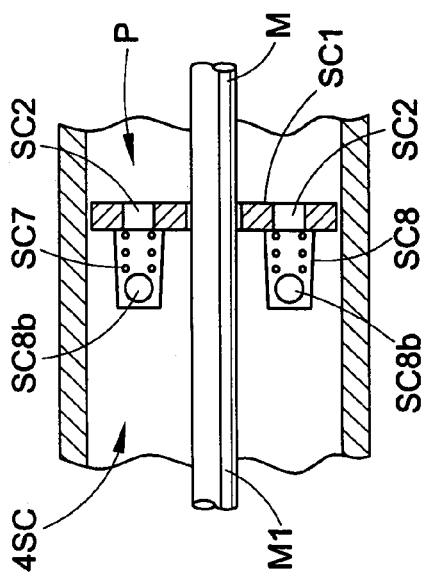
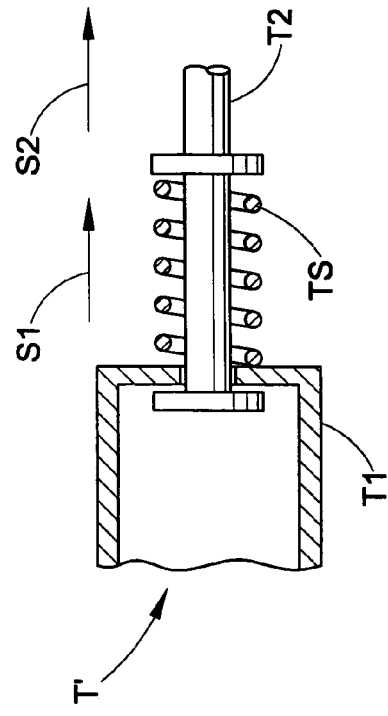

VENTED VALVE

CROSS-REFERENCE TO RELATED APPLICATIONS

This application claims priority from and benefit of the filing date of U.S. provisional application No. 60/655,547 filed Feb. 23, 2005, U.S. provisional application No. 60/591,835 filed Jul. 28, 2004 and U.S. provisional application No. 60/555,453 filed Mar. 23, 2004, and the disclosures of each of these provisional applications is hereby expressly incorporated by reference herein.

BACKGROUND

Dispensing liquid from a non-vented rigid container (i.e., sufficiently rigid to resist collapsing when liquid is dispensed) requires that air be vented into the container through the valve to obtain proper flow. Use of a conventional, unvented valve for dispensing liquid will result in liquid flow, if any, that is uneven and insufficient in terms of flow-rate as air must enter the container through the liquid flow passage. Vented valves that allow air to flow into the container are known but have been found to be unsatisfactory for many applications. In some cases, these vented valves rely on use of a vent-tube that extends deep into the container, and these tubes are not suitable for certain applications and also increase cost and are unsightly when visible in the container. Known vented valves are overly complex and, thus, expensive due to material and assembly cost. Also, these known valves often include a seal element that is common to the vent passage and the liquid flow passage and, the simultaneous opening of these passages often results in poor results, especially when dispensing liquid from a pressurized container. In general, known vented valves have been deemed sub-optimal for a wide variety of reasons, and a need has been found for a new vented valve suitable for use in dispensing liquids from pressurized or non-pressurized rigid containers.

SUMMARY

In accordance with the present development, a valve comprises a body; a liquid flow passage defined in the body and including a liquid inlet and a liquid outlet; a vent passage defined in the body and including an air inlet and an air outlet; a valve seat defined in the liquid flow passage; a liquid seal located adjacent the valve seat; a stem connected to the liquid seal and extending in the liquid flow passage away from the liquid seal through an aperture defined in the body. The stem comprises a distal end located external to the body. The stem is movable to and from a first position where the liquid seal is mated with the valve seat and a second position where the liquid seal is unseated from the valve seat. An actuator is connected to the distal end of the stem. The actuator is selectively movable to move the stem from the first position to the second position. A check-valve is adapted to block flow of liquid from the air outlet to the air inlet in the vent passage, and to allow flow of air from the air inlet to the air outlet in said vent passage.

For particular applications, the valve optionally further includes a surge control device and/or a keeper for the check-valve seal.

BRIEF DESCRIPTION OF THE DRAWINGS

The invention comprises various components and arrangements of components, preferred embodiments of which are illustrated in the accompanying drawings that form a part hereof and wherein:

FIGS. 8A, 8B, 8C and 8D illustrate four alternative surge control systems that can be incorporated into the valve of FIG. 1.

DETAILED DESCRIPTION OF THE PREFERRED EMBODIMENT

Figure 1:
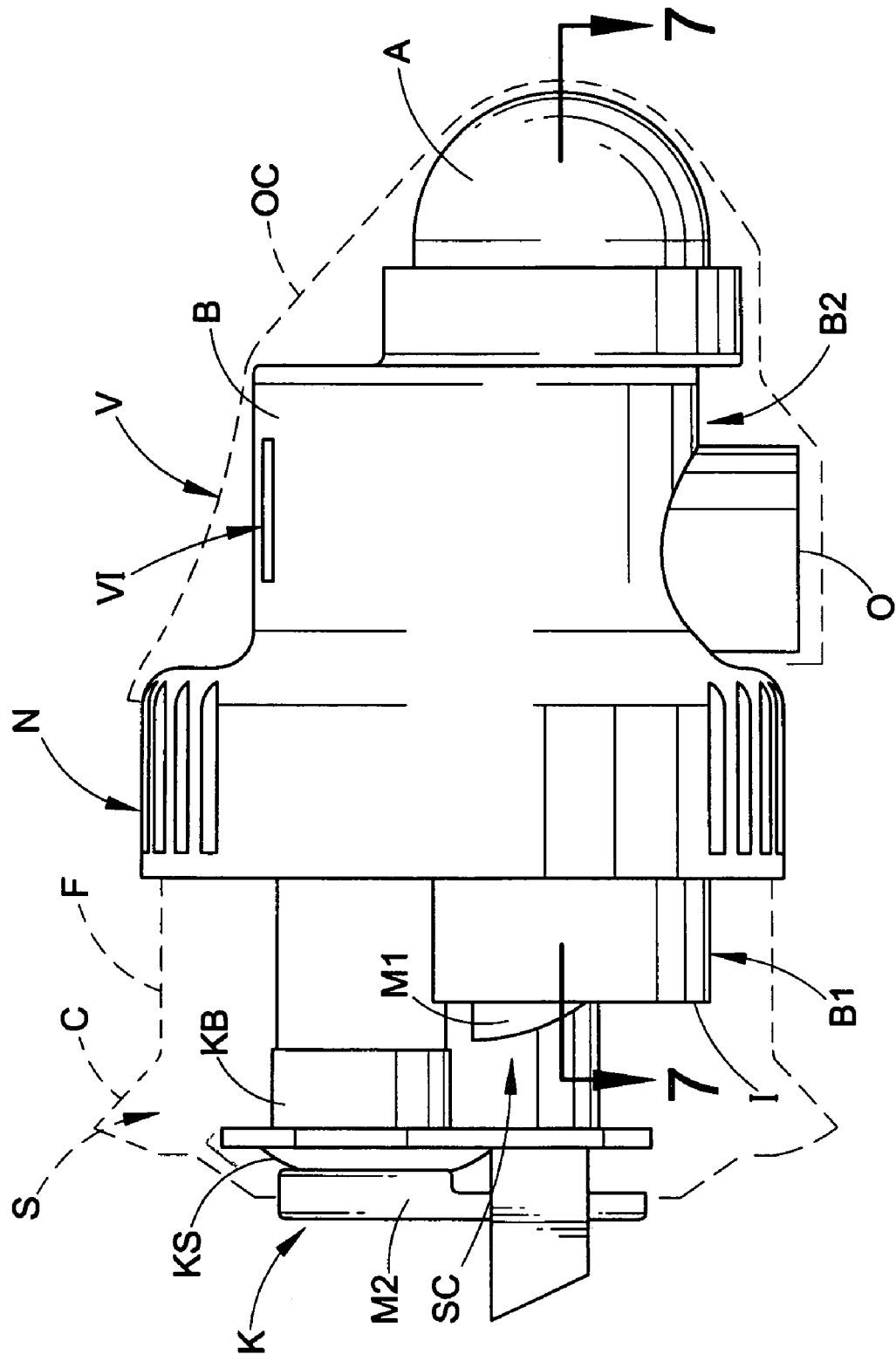
FIG. 1 is a side elevational view of a valve formed in accordance with the present development as connected to an associated rigid container (the container is shown diagrammatically)
Figure 2:
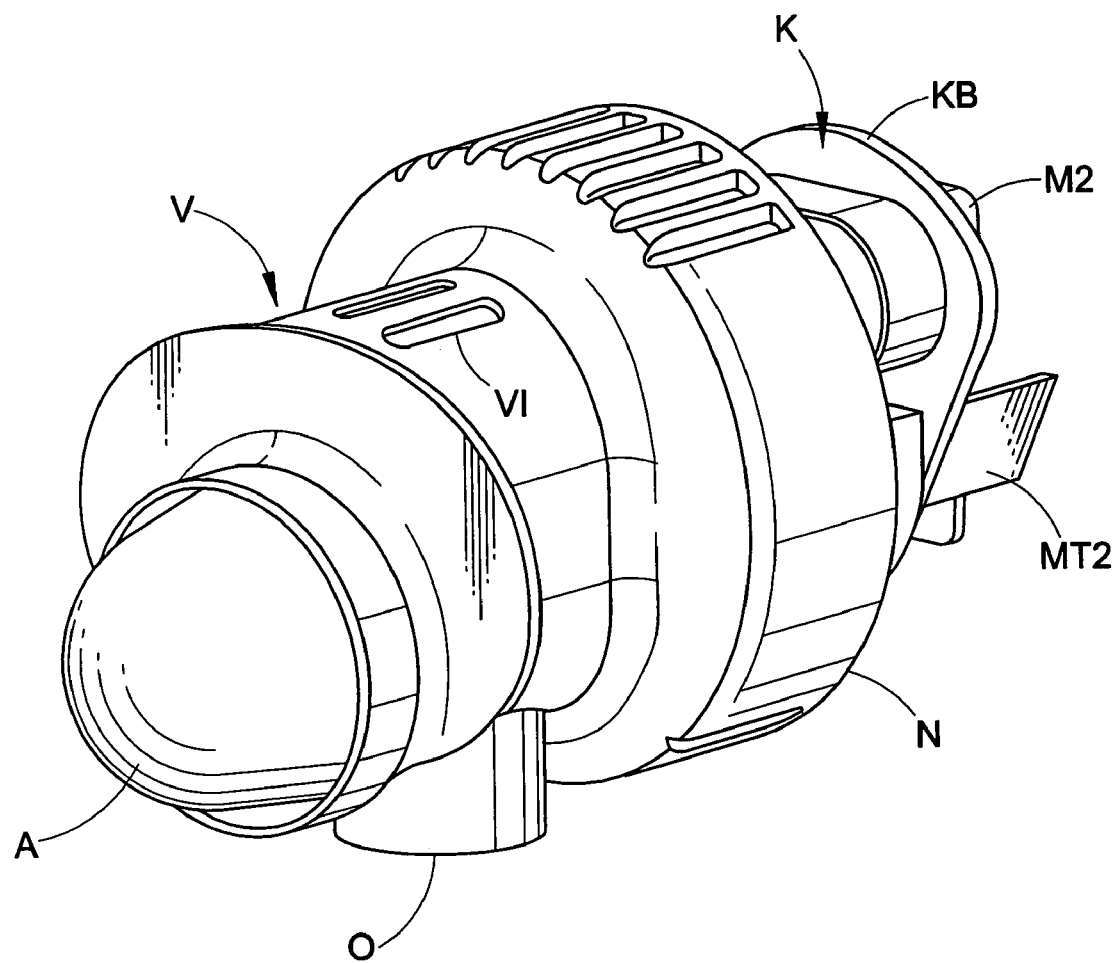
FIG. 2 is a front isometric view of the valve of FIG. 1.

FIGS. 1-5 illustrate a valve V formed in accordance with the present invention operatively connected to a rigid, i.e., non-collapsible, container C for dispensing liquid L contained in an interior space S of the container. More particularly, the valve V comprises a body B including a first portion B1 that is mated with an outlet F of the container C in a fluid-tight relationship. As shown herein, the first body portion B1 is received within the container outlet F. An integral or separate nut N is threaded to the outlet F and fixedly secures the valve V to the container C. In the case of an integral nut N, as shown, the nut N is defined as a one-piece construction with the body B. In the case of a separate nut, the nut is captured on the body B by a flange, and the flange of the body is captured between the container C and the nut when the nut is threadably engaged to the container outlet F. Container C is unvented and does not collapse when emptied and, as such, the valve V must provide a vent feature.

The valve body B comprises a second portion B2 that, in use, is located external to the container C. The second portion B2 of the body comprises a liquid outlet O and a vent inlet VI defined therein by openings for respectively dispensing liquid from and receiving ambient air into the container C via valve body B.

An actuator A is connected to the second portion B2 of the body. The actuator is adapted for selective manual movement by one desiring to dispense liquid from the container C via valve V. As shown herein, the actuator is a "push-button" type adapted for being depressed by manual force for opening the valve V. To aid in this process, the body B comprises at least one and preferably first and second ears R1,R2 (FIG. 2) that project laterally outward therefrom. Typically, two of a user's fingers are received behind these ears and the user's thumb is used to depress the actuator A inwardly toward the body B to open the valve and dispense liquid from the container C. The valve V comprises a stem T that is operatively coupled to the actuator A and that moves when the actuator is operated by a user to open the valve V as described in full detail below. Actuators other than the illustrated push-button type and other than self-closing are contemplated and it is not intended that the valve V be limited to any particular actuator type unless specified in the claims. Other suitable actuators include pull-to-open, twist-to-open, cam-actuated, and others that can be self-closing or manually closable.

The valve V comprises a check-valve sub-assembly K that, itself, comprises a check-valve base KB and a check-valve seal KS. The base KB is connected to or formed as a one-piece construction with the first body portion B1 and, thus, is located inside the space S of container C, in or near the container outlet F. The check-valve seal KS is connected to the base KB. The check-valve sub-assembly K allows ambient air to flow into the space S of container C (through a vent passage VP as shown, e.g., in FIG. 6A) while preventing escape of liquid and/or gas from the container space S through the same vent passage VP in the opposite direction.

Figure 6A:
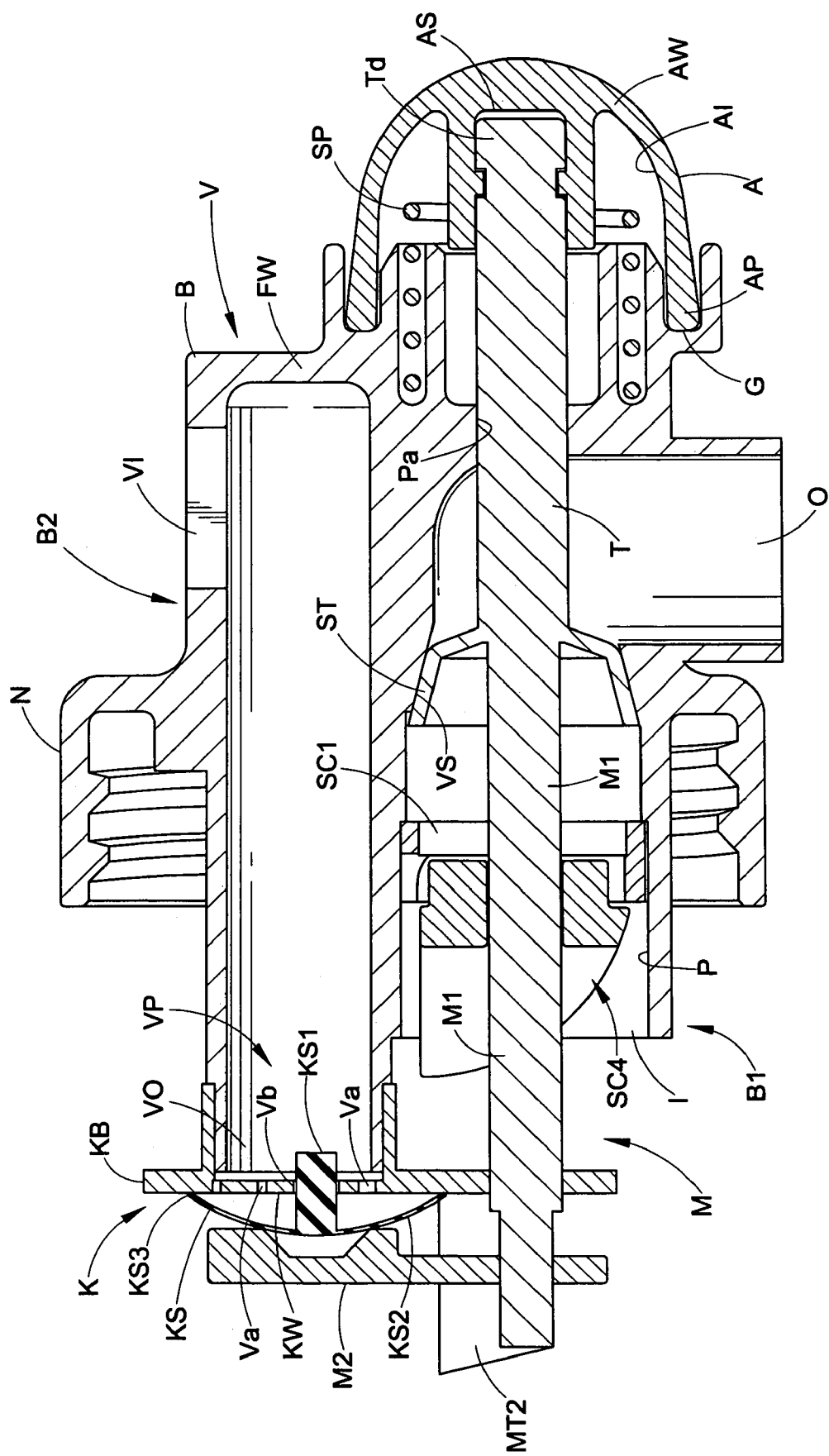
FIG. 6A is a sectional view as taken along line 6-6 of FIG. 4.
Figure 6B:
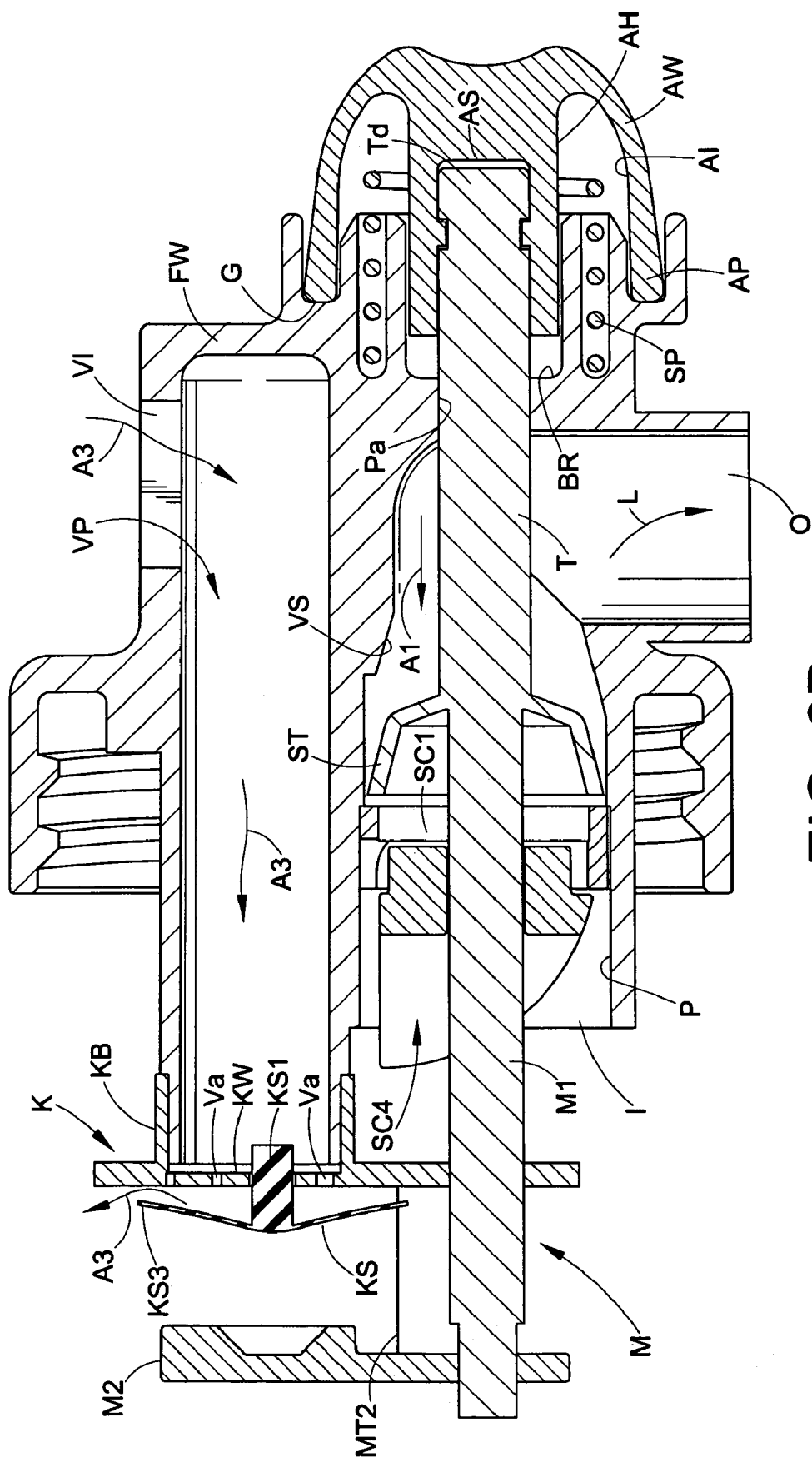
FIG. 6B is the same as FIG. 6A but shows the valve in an opened state.

FIG. 6A is a sectional view that reveals the internal structure of the valve V. There, it can be seen that the body B defines a vent passage VP that extends from the vent inlet VI to the check-valve base KB. The check-valve base KB defines a vent passage outlet VO. In the illustrated embodiment, the vent passage outlet VO comprises one or more outlet apertures Va defined through an end-wall KW of the check-valve base (in the illustrated embodiment, the end wall KW is a separate piece, but it is contemplated that the entire check-valve base KB including wall KW be defined as a one-piece construction, alone or also together with the remainder of body B). The check-valve seal KS is an umbrella-type resilient elastomeric seal member, preferably a one-piece construction, including a stem KS1 that is anchored in an anchoring aperture Vb also defined in the wall KW. The check-valve seal KS further comprises the seal body KS2 that defines an umbrella-like structure defining a concavity oriented toward the wall KW and comprising a circular peripheral edge KS3 that mates with the wall KW to define a fluid-tight seal. Fluid pressure within space S of container C, combined with the natural shape and resiliency of the seal KS combine to urge the peripheral edge KS3 of seal into this fluid-tight mating with the end wall KW of the check-valve base so that the seal KS prevents escape of liquid and/or gas from the container space S into the vent passage VP via vent outlet apertures Va. On the other hand, as described further below, a reduction of pressure within space S of container when liquid is dispensed relative to ambient pressure outside of container C will cause the air pressure within vent passage VP to urge the peripheral edge KS3 of the seal away from the end wall KW as shown in FIG. 6B so that air can flow into space S of container C via vent inlet VI, vent passage VP and apertures Va defined in end wall KW as indicated by the arrows A3. When the pressure within container space S increases sufficiently to overcome ambient pressure within the vent passage VP, the pressure within container space S and the resilient structure of the seal KS cause the peripheral edge KS3 of seal to once again mate with the end wall KW in a fluid-tight manner prevent flow of liquid out of and air into container space S via vent passage VP. Alternative check-valve structures are contemplated such as, e.g., a ball-type check valve or the like.

To dispense liquid from the container space S, the valve body B further comprises an axially extending liquid outlet passage P, inlet I to the passage P from container space S, and an outlet O for dispensing liquid from the passage P. The inlet I communicates with the container space S when the valve V is operatively installed and, as shown, is defined in the first body portion B1. On the other hand, the outlet O of liquid passage is defined in the second body portion B2 so that it is located external to the container C when the valve V is installed. When the valve is opened as described below, liquid from container space S is dispensed under force of gravity and/or pressure within the container space S for consumption or other use via passage P at the outlet O.

The body B defines or otherwise comprises a valve seat VS in communication with the liquid passage P. A seal ST mates with the valve seat VS in a fluid-tight manner to block flow of liquid from container space S to outlet O through passage P. As shown herein, the seal ST comprises a dish-shaped resilient elastomeric member having a circular periphery and arranged with its concave face oriented toward the container interior space S so that it convex face mates with the valve seat VS in a fluid-tight manner. Owing to this arrangement, fluid pressure in the container space S exerts a flattening force on the seal ST which improves the sealing engagement between the seal ST and the valve seat VS. As described further below, when the seal ST is lifted away from the seat VS (FIG. 6B), liquid L flows from the container space S into passage P via inlet I and is dispensed from the valve V via outlet O. Other seal types such as a flapper-valve or the like are contemplated.

The valve V further comprises a valve stem T that is operatively coupled to or formed as a one-piece construction with seal ST. The stem T extends axially outward from the seal ST through the passage P and projects through an aperture Pa defined in front wall FW of body B to a distal end Td located external to the body B. The distal end Td is operatively coupled to the actuator A, as by the illustrated mechanical interlock with socket AS of actuator and/or adhesive or the like, so that manual movement of the actuator A moves the stem axially toward inlet I and lifts seal ST away from valve seat VS to allow liquid L flow from the inlet I to outlet O via passage P. The sliding interface between the stem T and aperture Pa is as close as possible to substantially inhibit flow of liquid from liquid passage P through aperture Pa into actuator A. As shown, it is preferred that the vent inlet VI be located remotely from the liquid outlet O, preferably oriented in an opposite direction, i.e., upwardly, when the valve V is in its operative liquid-dispensing position.

With further reference to FIGS. 6A and 6B, the actuator A is preferably defined as a one-piece molded elastomeric or other resilient member as shown including a hollow cup-like interior AI defined by an outer wall AW. The wall AW preferably defines a circular periphery AP that is received in a mating groove G defined in the front wall FW of body B. In the illustrated embodiment, the actuator is normally biased to its extended position (corresponding to a closed state for the valve V as show in FIG. 6A) owing to its natural resiliency and shape. Optionally a spring such as a coil spring SP is positioned operatively between wall FW and actuator A in space AI to bias the actuator to the illustrated extended position. In the normal, extended condition, the actuator A pulls the stem T outwardly from the aperture Pa of body B which, in turns, pulls the seal ST tightly against seat VS to prevent flow of liquid between seal ST and valve seat VS. If a separate spring SP is used, the actuator A can be a non-resilient member such as a simple button or other structure connected to or formed as a part of stem T.

Referring now to FIG. 6B, it can be seen that when the actuator A is manually moved (depressed) from the extended position toward front wall FW of valve body B to a second, depressed position, the wall AW of the actuator A resiliently deforms and the stem T, including seal ST, is shifted from the first position to a second position as indicated by the arrow A1 where the seal ST is lifted away from seat VS. This allows liquid L to flow from container space S into passage P between seal ST and seat VS and, from there, through outlet O. In order to prevent leakage of liquid from passage P through the aperture Pa into the actuator A, the actuator A is defined with a hub AH that closely slidably engages the valve body B. Specifically, the aperture Pa is in communication with a recess BR defined in the front wall FW, and the hub AH of the actuator A closely slides in the recess BR and sealingly engages the recess BR to prevent flow of liquid between the hub AH and the wall portion that defines the recess BR in the event liquid escapes through the aperture Pa. Furthermore, when the actuator A is fully depressed, the hub AH of the actuator A can be configured to bottom-out in the recess BR so that it sealingly abuts to body B and prevents any liquid that leaks from aperture Pa from flowing between the hub AH and the body portion that defines the recess BR. Also, an O-ring seal can be used between the hub AH and wall of recess BR to sealingly engage these structures. In such case, the O-ring can be connected to the wall of the recess BR or to the hub AH.

In response to fluid being dispensed from container C, air is drawn into container space S via vent inlet VI, vent passage VP and check-valve K as indicated by arrows A3. The check-valve seal KS is unseated from end wall KW of check valve base to allow flow of vent air into the container space S due to the pressure differential that occurs when liquid is dispensed from otherwise un-vented container C via passage P as described above. When manual pressure is released from actuator A, its natural resiliency (or a biasing spring SP, if present) causes the actuator to return to its normal, extended position as shown in FIG. 6A, so that it draws stem T to its outward from aperture Pa of body and so that seal ST again seats against seat VS to prevent further dispensing of liquid. When the seal ST seats, the fluid pressure in the container space S causes check-valve seal KS to once again seat against wall KW to prevent flow of liquid from container space S into vent passage VP.

As shown in phantom lines in FIG. 1, the valve V optionally further comprises a cover such as an over-cap and/or over-wrap OC defined from a molded polymeric or other material such as cardboard, a tamper-evident film or the like that is releasably fitted to body B. The cover OC preferably overlies and protects the vent inlet VI and liquid outlet O from contamination and discourages and reveals tampering with the valve V and/or contents of container C. In the case where the cover is a hard polymeric or cardboard material or the like, it also prevents accidental movement of actuator A during shipping and handling of a filled container C as could lead to leakage of liquid from the container C. The cover OC can be provided in two or more sections/portions, including flexible film sections and/or seals that cover the vent inlet VI and liquid outlet O and a more rigid polymeric or cardboard material that covers the actuator A.

The valve V further comprises a seal keeper arm M defined from molded plastic or the like and having a first portion M1 connected to or formed as a part of the stem T and a second portion M2 located adjacent the check-valve seal KS. In the illustrated embodiment, the seal keeper arm M is L-shaped and the first portion M1 is formed as a one-piece construction with and as an axially extension of the stem T. As shown, the first portion M1 of the arm M projects centrally from the dish-shaped seal element ST inwardly through the liquid inlet I of passage P. The second portion M2 of the seal keeper arm M is arranged transversely to the first portion M1 and is shaped like and referred to herein as a paddle. As shown herein, the paddle M2 is defined separately from and connected to the first portion M1, but that could also be defined as part of the first portion M1. As such the stem T and entire seal keeper arm M can be defined together as a one-piece construction from molded plastic or other material. In any case, the seal keeper arm M moves as a unit with the stem T when the actuator A is pressed and/or released.

When the valve V is closed (FIG. 6A), the paddle portion M2 of the seal keeper arm M engages the check-valve seal KS and presses same into firm abutment with the wall KW under biasing force of the actuator A (and/or the optional spring) and ensures that liquid cannot flow from the container space S into the vent passage VP as would cause leakage especially during rough shipping/handling conditions. When the actuator A is operated (depressed) to shift the stem T and open the valve V, the seal keeper arm M moves axially with the stem T from the first position (FIG. 6A), where the paddle M2 is engaged with the check-valve seal KS, to a second position, where the paddle M2 is moved out of contact with and spaced from the check-valve seal KS (FIG. 6B) to allow normal operation of the check-valve seal KS. When manual pressure is released from actuator A, its natural resiliency (and/or a biasing spring if present) causes the actuator A to return to its normal, extended position as shown in FIG. 6A, so that it draws stem T outward from aperture Pa of body and so that seal ST mates with seat VS to prevent further dispensing of liquid. As the stem T is drawn outward from the aperture Pa during closing of the valve V, the seal keeper arm M moves back to its first position where the paddle M2 engages and presses on the check-valve seal KS and ensures that the check-valve seal KS is firmly seated against wall KW to prevent liquid flow from the container space S into the vent passage VP. In particular, the seal keeper arm M is dimensioned and positioned so that the paddle M2 thereof abuts the check-valve seal KS and presses and holds the check valve seal KS into firm engagement with the wall KW when the stem T is moved backed to its first position when the valve V is closed. It is most preferred that the liquid seal ST be at least partially or fully seated with the seat VS before the paddle M2 of seal keeper arm M engages the check-valve seal KS. In some, high-pressure applications, it is preferred that the paddle M2 be conformed and dimensioned to both engage (press on) the check-valve seal KS and cover the most or all of the check-valve seal KS when the valve is closed and paddle M2 is in its first position (FIG. 6A) in order to protect the check-valve seal KS and prevent it from being deformed and possibly extruded through the vent apertures Va. In one such arrangement, the paddle M2 is conformed to cover substantially all of the check-valve seal and to press on the periphery KS3 of same or press on the wall KW surrounding the periphery KS3.

It is important that the paddle M2 of seal keeper arm M not rotate relative to the body B in order to assure that the paddle stays aligned with the check valve seal KS as required to engage same as described. To this end, the paddle M2 is non-rotatable relative to the body B. In the illustrated embodiment, the valve V comprises one or more tabs MT1,MT2 (easily seen in FIGS. 3,4,5) that are fixed in position relative to the remainder of the body B. As shown herein, the tabs MT1,MT2 are defined as part of a one-piece molded plastic (polymeric) construction with the check-valve base KB. The paddle M2 is slidably located between the tabs MT1,MT2, and the tabs prevent rotation of the paddle to ensure that paddle is always properly aligned with the check-valve seal KS.

Figure 7A:
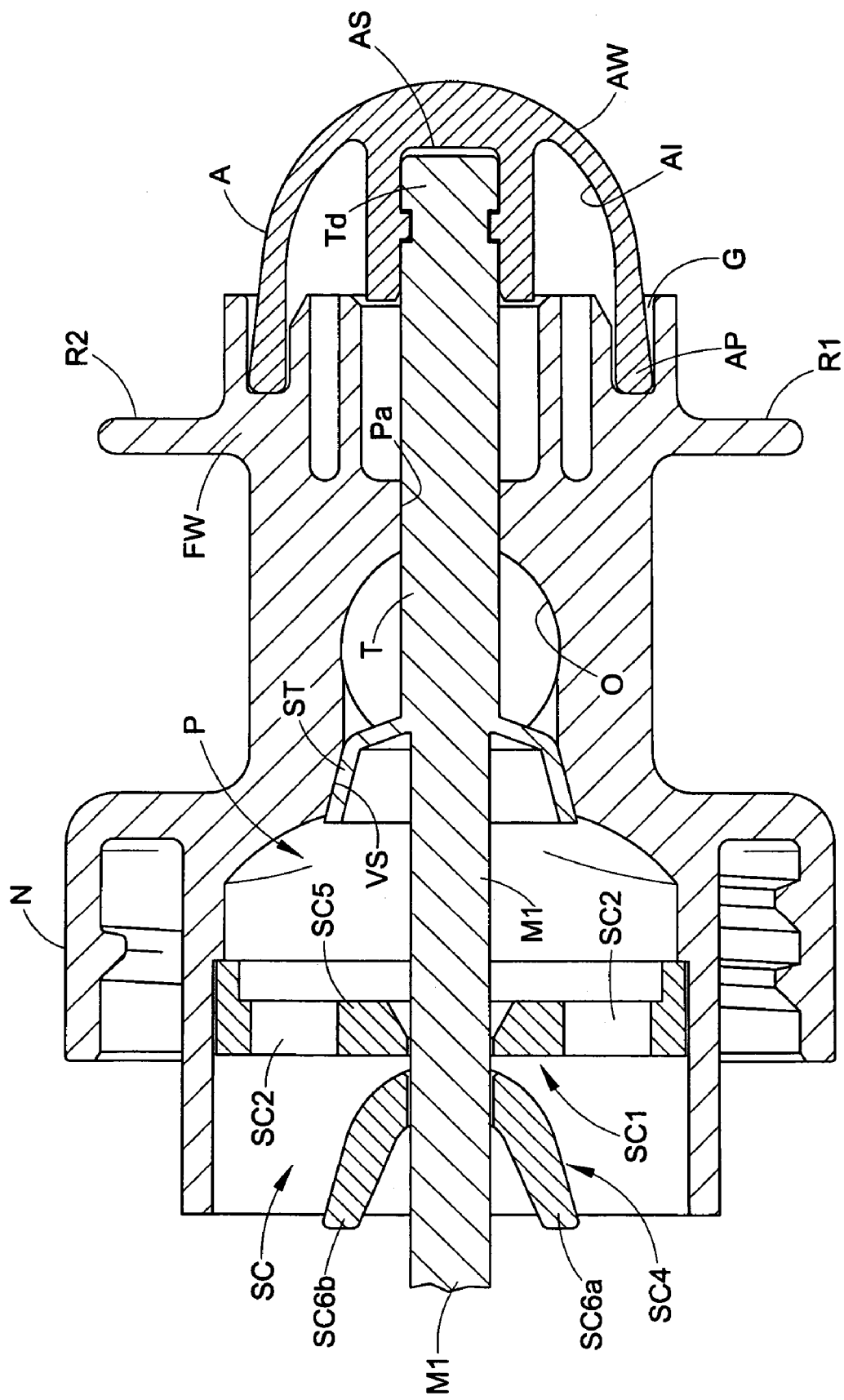
FIG. 7A is a sectional view as taken along line 7-7 of FIG. 1.
Figure 7B:
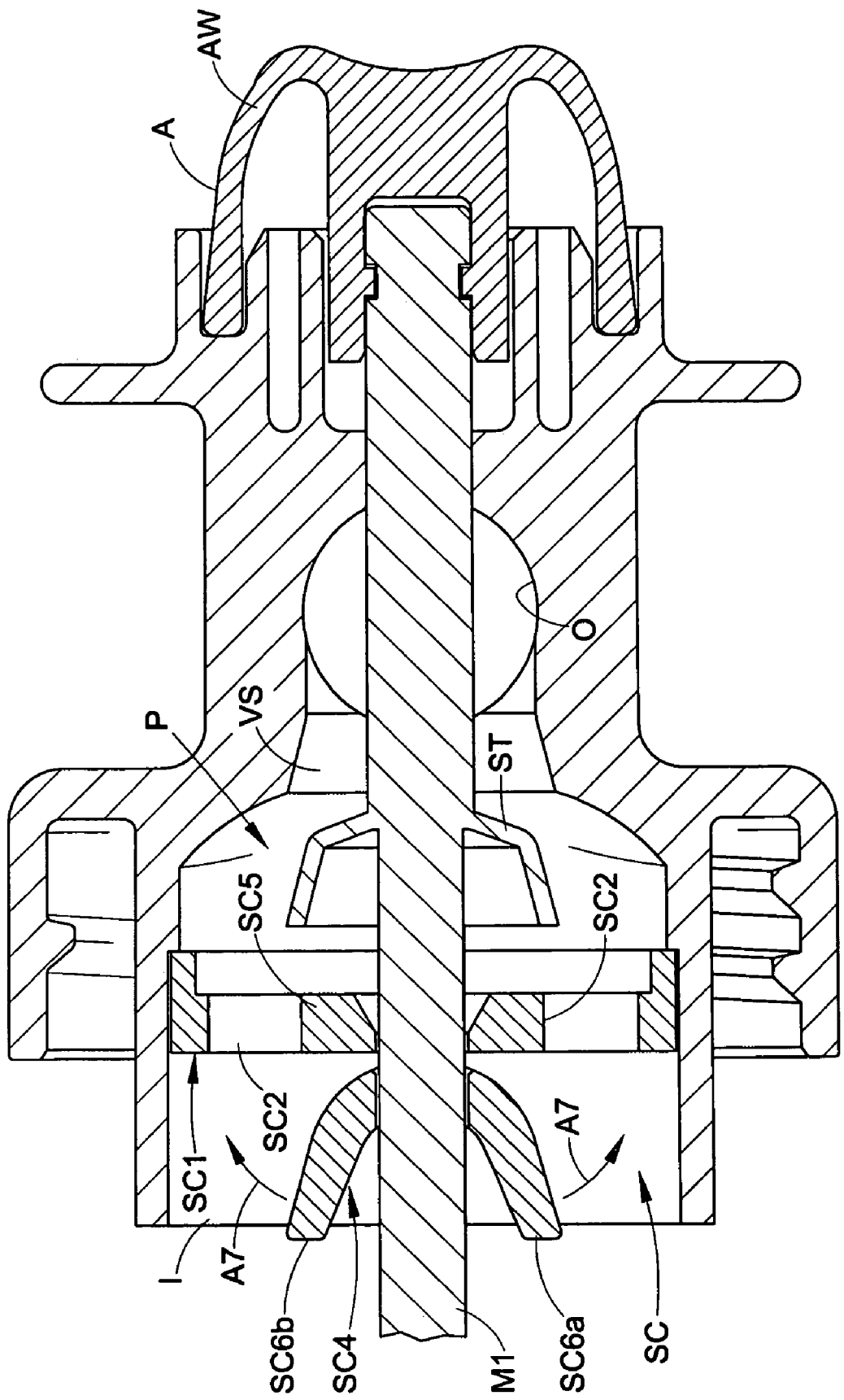
FIG. 7B is the same as FIG. 7A but shows the valve in an opened state.

For applications where the valve V is intended to dispense liquids from a pressurized container, i.e., a carbonated beverage, the valve V is fitted with an optional surge control device SC (FIG. 3) that limits an initial burst or "outrush" of liquid from the space S of a container via passage P and outlet O when the pressure in the container space S is elevated owing to carbonation or other influences and when the valve V is first opened to dispense liquid. As can be seen clearly in FIGS. 7A,7B the surge control device SC comprises a diffuser SC1 that is located in and that spans the liquid flow passage P upstream from the valve seat VS. The diffuser SC1 defines a plurality of apertures or flow spaces SC2 that allow liquid to flow through the diffuser on to the valve seat VS. The first portion M1 of the seal keeper arm M passes through the diffuser SC1 and the seal keeper arm M is slidable relative to the diffuser so that the diffuser does not interfere with movement of the seal keeper arm M.

The surge control device SC further comprises a butterfly baffle SC4 defined as a one-piece polymeric construction and connected to or located adjacent the diffuser SC1. As shown, the baffle SC4 comprises a body SC5 that is fixedly secured to the diffuser SC1, by a friction fit or the like. Seal keeper arm M also extends through the body SC5 of the baffle SC4. The baffle SC4 also comprises first and second resilient wings SC6a,SC6b that are connected to the body SC5. The natural position for the wings SC6a,SC6b is shown, where they are curled outwardly away from the diffuser SC1 and are spaced from flow passages SC2. When the valve V is first opened to dispense liquid, any initial surge of liquid into passage P from its inlet I toward the outlet O, based upon the large pressure differential between the pressurized container space S and the ambient atmosphere external to the valve V, will flatten the resilient baffle wings SC6a,SC6b against the diffuser SC1 (as indicated by arrows A7 in FIG. 7B), so that the wings SC6a, SC66b substantially occlude the flow spaces SC2 and inhibit flow of liquid through the flow spaces SC2 of the diffuser SC1. As the initial surge or out rush of liquid through passage P subsides when the pressure differential between internal container space S and the external atmosphere lessens, the natural bias of the wings SC6a,SC6b causes them to resume a curled shaped (close to their natural shape), where they are moved away from the diffuser SC1 and do not substantially obstruct the diffuser flow spaces SC2.

It is not intended that the valve V and components of same be limited to any particular material. Except for the optional actuator spring SP, which can be defined from spring steel or a polymeric material, all components of valve V described herein are preferably defined as molded polymeric members. For purposes of example only, it is noted that suitable materials include but are not limited to: body B and diffuser SC1—polypropylene or polyethylene; Actuator A and butterfly baffle SC4—a thermoplastic elastomer (TPE); Stem T and liquid seal ST and seal keeper arm M—polyethylene; check-valve seal KS—an ethylene-propylene elastomer such as e.g., EPDM.

Alternatives to the surge control device SC are contemplated and deemed within the scope of the present development and can be used as part of the valve V instead of and/or in addition to the surge control device SC. FIG. 8A illustrates a surge control device 2SC that is similar to the surge control device SC, except that the baffle SC4 is replaced by a spool 2SC4 that is slidably captured on the on the first portion M1 of the seal keeper arm between the diffuser SC1 and a stop SC5 and that slides between an extended position (shown in FIG. 8A) where it is spaced from the diffuser SC1 and does not interfere with flow of liquid through the diffuser passages SC2 and a compressed position where it is abutted with the diffuser SC1 and substantially blocks/restricts the flow passages SC2 enough to prevent a surge of liquid therethrough. A spring SC7 is operatively positioned between the diffuser SC1 and the spool 2SC4 and biases the spool to the extended position. When valve V is first opened, the surge of liquid into passage P moves spool 2SC4 to its compressed position to reduce flow through the spaces SC2 of diffuser SC1. After the initial liquid surge subsides as liquid leaks around the spool, the biasing spring SC7 overcomes the force of the liquid and moves the spool 2SC4 away from the diffuser SC1 to open the diffuser flow passages SC2 to increase the flow rate.

FIG. 8B shows another alternative embodiment of a surge control device 3SC where valve V (shown schematically) comprises an inlet pipe P' located upstream from and surrounding the liquid flow passage P (and preferably also check-valve K) so that all liquid flowing to the liquid passage P (and preferably all air flowing in the opposite direction from vent passage VP) flows through inlet pipe P'. A flow-control spool 3SC4 is slidably captured in the inlet pipe P' between first and second shoulders SC5a,SC5b and is biased by spring SC7 away from shoulder SC5b into abutment with shoulder SC5a. Inlet pipe P' defines one or more radial openings i adjacent shoulder SC5b. The spool 3SC4 is closely fitted in the inlet pipe P' so that little liquid can flow around the spool toward valve V. The spool 3SC4 slides between an extended position (shown in FIG. 8B) where it is spaced from the stop SC5b and does not interfere with flow of liquid into the inlet pipe P' via radial inlets i and a compressed position where the spool 3SC4 is abutted with the shoulder stop SC5b and substantially blocks the radial inlets i enough to prevent a surge of liquid therethrough. When the valve V is first opened, the surge of liquid into the upstream open end P1' of inlet pipe P' moves spool 3SC4 to its compressed position where it blocks inlets i. The close fit of spool 3SC4 in the passage P' severely limits liquid flow downstream to the valve V when spool is compressed. After enough liquid leaks past spool 3SC4 so that the initial liquid surge subsides, the spring SC7 overcomes the force of the liquid and moves the spool 3SC4 away from the shoulder stop SC5b to open inlets i to increase the flow rate into the inlet pipe P' to the valve V.

FIG. 8C illustrates another surge control device 4SC comprising a cage SC8 located adjacent diffuser SC1. The cage SC8 holds balls SC8b in respective alignment with the flow passages SC2. Springs SC7 respectively bias balls to an extended position within the cage SC8 spaced from the flow passages SC2. When valve V is first opened, the surge of liquid into passage P moves balls SC8b to their compressed positions where they respectively obstruct the flow passages SC2 with which they are aligned. After enough liquid leaks past the balls SC8B through the diffuser SC1 so that the initial liquid surge subsides, the biasing springs SC7 are able to overcome the force of the liquid and move the balls SC8b away from the diffuser SC1 to open the flow passages SC2 to increase the flow rate.

FIG. 8D illustrates an alternative arrangement for stem T that helps prevent an out rush of liquid from the outlet O when valve V is first opened by providing a staged opening of the valve. As shown, the alternative stem T' comprises first and second slidably interconnected portions T1,T2. A spring TS is located operatively between the first and second stem portions and biases them into an extended position as shown. The actuator button A (not shown in FIG. 8D) is connected to or defined as part of the first stem portion T1, and the liquid seal ST is connected to or defined as part of the second stem portion T2. When a user depresses the actuator button to unseat the liquid seal ST and open the valve V, the first stem portion T1 slides relative to the second stem portion T2 against the biasing force of the spring TS and most, but not all, of this initial movement of the actuator button A is absorbed by the spring TS and not translated to the second stem portion T2 in this first stage as indicated by arrow S1. As such, the liquid seal ST is only slightly unseated during this first stage S1 to prevent a large out rush of liquid. The first portion T1 of the stem T' eventually compresses the spring TS sufficiently and/or makes hard contact with the second portion T2 of stem T' so that the second stem portion T2 moves as a unit with the first stem portion in a second stage as indicated by the arrow S2. This stem T' provides a staged unseating of the liquid seal ST, wherein the seal ST is lifted slowly and minimally away from seat VS during the first stage S1 when spring TS absorbs most movement of the actuator button A, and wherein the liquid seal ST is fully unseated by movement of the stem portion T2 as a unit with the first stem portion T1 during a second stage S2.

Figure 3:
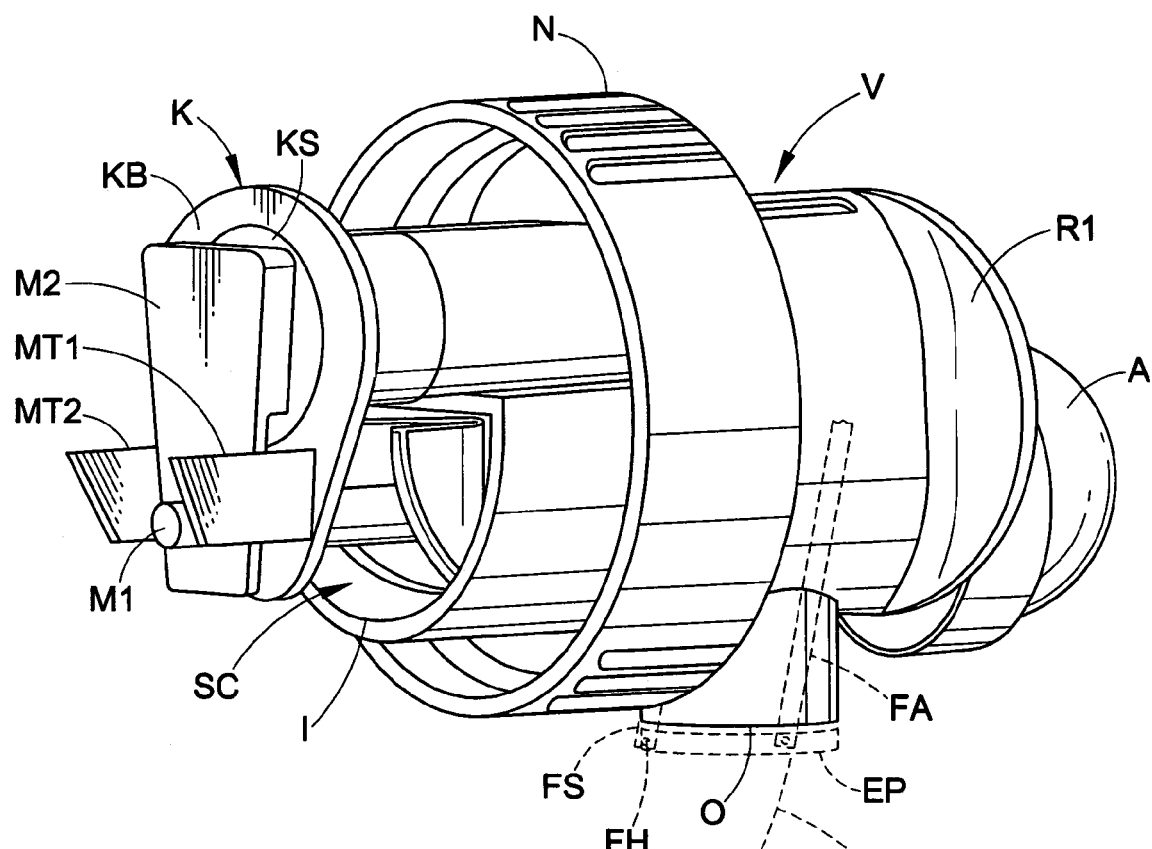
FIG. 3 is a rear isometric view of the valve of FIG. 1.
Figure 4:
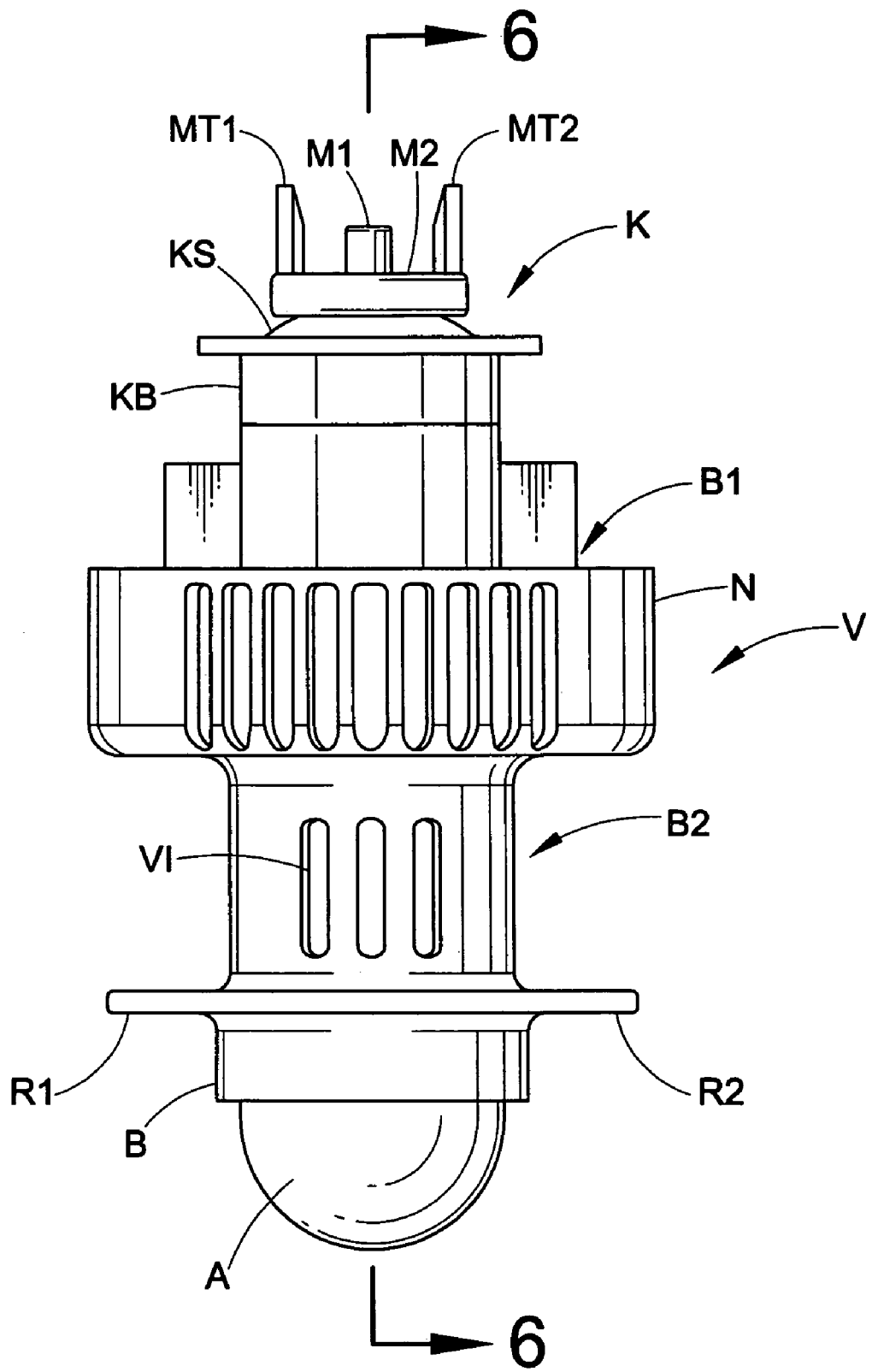
FIG. 4 is a top plan view of the valve of FIG. 1.
Figure 5:
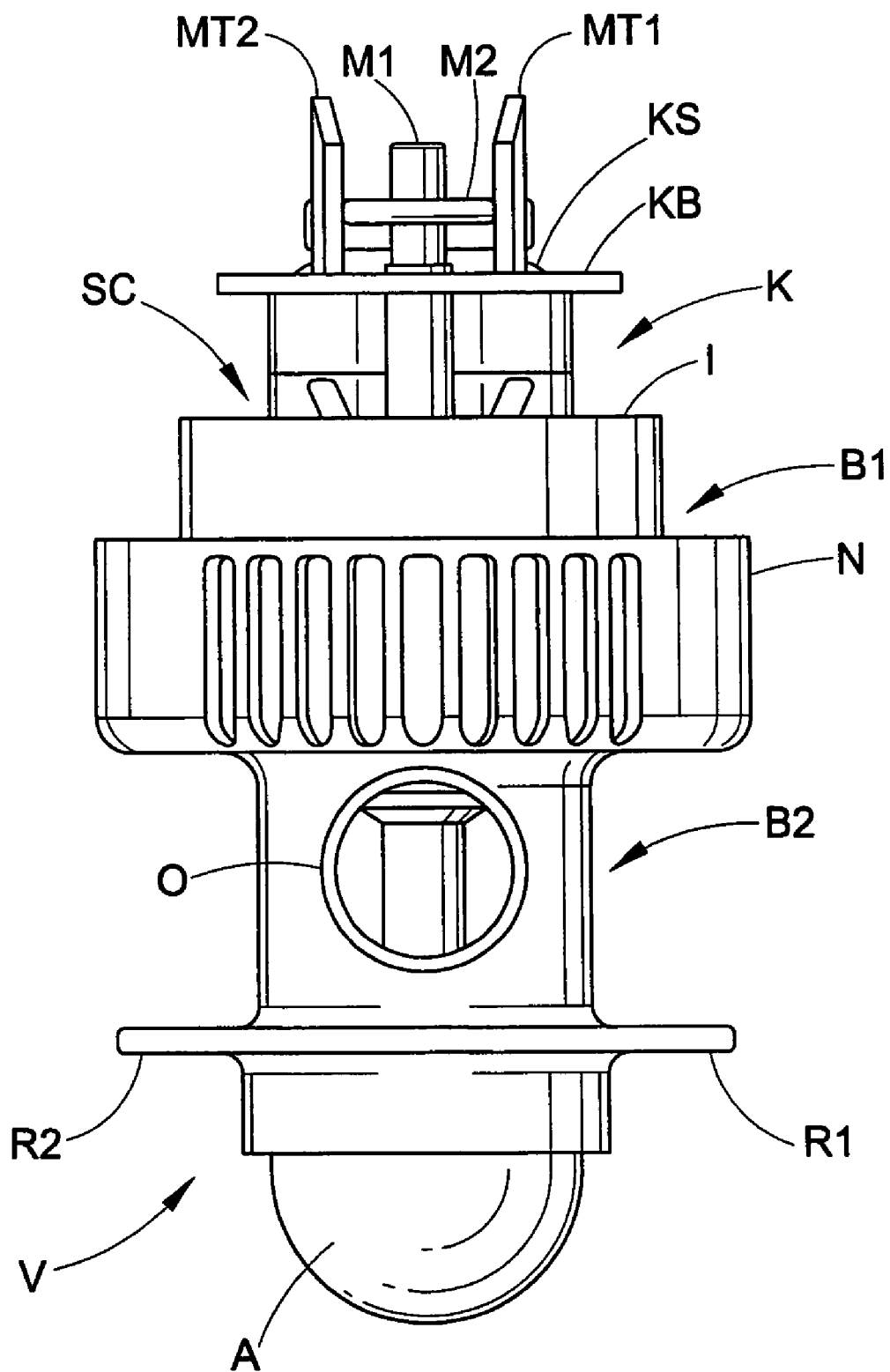
FIG. 5 is a bottom plan view of the valve of FIG. 1.

As shown in FIG. 3, the valve V optionally further comprises a drip-control flap FP disposed in covering relation with said liquid outlet O and selectively manually movable to a position away from said liquid outlet to dispense liquid. In the illustrated example, at least one arm FA is connected to the flap FP and located to be engaged by a users fingers behind the ears R1,R2 during a liquid dispensing operation to pivot flap FP about hinge FH away from the outlet O to allow liquid to be dispensed as indicated by arrow AF. The flap FP is preferably biased by a torsion spring FS or the like into the closed position as shown.

The invention has been described with reference to preferred embodiments. Obviously, modifications and alterations will occur to others upon a reading and understanding of this specification. It is intended that the claims be construed literally and/or according to the doctrine of equivalents as including all such modifications and alterations.

The invention claimed is:

1. A valve comprising:
    a body;
    a liquid flow passage defined in said body and including a liquid inlet and a liquid outlet;
    a vent passage defined in said body and including an air inlet and an air outlet, wherein said air outlet of said vent passage is defined in a check-valve base by at least one air outlet aperture;
    a valve seat defined in said liquid flow passage;
    a liquid seal located adjacent said valve seat;
    a stem connected to said liquid seal and extending in said liquid flow passage away from said liquid seal through an aperture defined in said body, said stem comprising a distal end located external to said body, wherein said stem is movable to and from a first position where said liquid seal is mated with said valve seat and a second position where said liquid seal is unseated from said valve seat;
    an actuator connected to said distal end of said stem, said actuator selectively movable to move said stem from said first position to said second position;
    a check-valve adapted to block flow of liquid from said air outlet to said air inlet in said vent passage, and to allow flow of air from said air inlet to said air outlet in said vent passage, wherein said check-valve comprises a check-valve seal that normally blocks said at least one air outlet aperture and that is movable to a position where said at least one air outlet aperture is open in response to air flow in said vent passage from said air inlet toward said at least one air outlet aperture;
    a check-valve seal keeper operatively connected to and movable with said stem, wherein said check-valve seal keeper is engaged with said check-valve seal when said stem is located in said first position and disengaged from said check-valve seal when said stem is moved to said second position.

2. The valve as set forth in claim 1, wherein said valve seat is located between said liquid inlet and said liquid outlet in said liquid flow passage.

3. The valve as set forth in claim 1, wherein stem and liquid seal are defined together as a one-piece molded polymeric construction.

4. The valve as set forth in claim 1, wherein said liquid flow passage and said vent passage are completely isolated from each other.

5. The valve as set forth in claim 1, further comprising a drip-control flap disposed in covering relation with said liquid outlet and selectively manually movable to a position away from said liquid outlet to dispense liquid.

6. The valve as set forth in claim 1, wherein said actuator comprises a molded polymeric button connected to said body, said button arranged in an extended condition when said stem is located in said first position and that is resiliently deformable to a depressed condition to move said stem to said second position.

7. The valve as set forth in claim 6, wherein said actuator is defined as a one-piece molded resilient polymeric member including a hollow cup-like interior defined by an outer wall that is received in a mating groove defined by said body, wherein said outer wall normally resiliently biases said actuator to said extended condition.

8. The valve as set forth in claim 7, wherein said body defines a recess in communication with said aperture through which said stem projects, and wherein said actuator defines a hub that is closely slidably received in said recess when said actuator is depressed and resiliently deformed into said depressed condition.

9. The valve as set forth in claim 1, further comprising a spring that operatively connects said actuator button to said stem, wherein said spring resiliently absorbs some initial movement of said actuator until said actuator and stem become engaged and move as a unit.

10. The valve as set forth in claim 1, wherein said check-valve seal keeper comprises:
    a keeper arm having a first portion that projects axially inward from said liquid seal through said inlet of said liquid flow passage, and a second portion that projects transversely from said first portion of said arm.

11. The valve as set forth in claim 10, wherein said stem, said liquid seal and said first portion of said keeper arm are defined together as a one-piece molded polymeric construction.

12. The valve as set forth in claim 11, wherein said second portion of said keeper arm is prevented from rotating relative to said body to maintain alignment between said second portion of said keeper arm and said check-valve seal.

13. The valve as set forth in claim 12, wherein said check-valve base comprises first and second tabs between which said second portion of said keeper arm is slidably located, wherein said first and second tabs prevent rotation of said second portion of said keeper arm relative to said body.

14. The valve as set forth in claim 1, wherein said check-valve seal comprises an umbrella-shaped body comprising: (i) a stem that is anchored in an anchoring aperture defined in the check-valve base; and, (ii) a seal body connected to said stem, said seal body defining a resilient umbrella-like structure including a concavity oriented toward the check-valve base, wherein said seal body includes a peripheral edge that mates with the check-valve base and covers said at least one air outlet aperture, and wherein said seal body is resiliently deformable to lift said peripheral edge away from said check-valve base in response to air flowing from said air inlet through said vent passage and said at least one air outlet aperture.

15. The valve as set forth in claim 1, further comprising a nut adapted for threaded connection to an associated container outlet.

16. The valve as set forth in claim 15, wherein said nut is defined as a one-piece construction with said body.

17. A valve comprising:

a body;

a liquid flow passage defined in said body and including a liquid inlet and a liquid outlet;

a vent passage defined in said body and including an air inlet and an air outlet;

a valve seat defined in said liquid flow passage;

a liquid seal located adjacent said valve seat;

a stem connected to said liquid seal and extending in said liquid flow passage away from said liquid seal through an aperture defined in said body. said stem comprising a distal end located external to said body. wherein said stem is movable to and from a first position where said liquid seal is mated with said valve seat and a second position where said liquid seal is unseated from said valve seat;

an actuator connected to said distal end of said stem, said actuator selectively movable to move said stem from said first position to said second position;

a check-valve adapted to block flow of liquid from said air outlet to said air inlet in said vent passage, and to allow flow of air from said air inlet to said air outlet in said vent passage;

a surge control device separate from the liquid seal and adapted to impede flow of liquid from said liquid inlet to said liquid outlet in response to an initial surge of liquid moving from said liquid inlet toward said liquid outlet when said liquid seal is unseated from said valve seat.

18. The valve as set forth in claim 17, wherein said surge control device comprises:

a diffuser that spans said liquid passage and that defines at least one flow passage therethrough; and, a movable element that is normally spaced from said diffuser and that is adapted to move adjacent to said diffuser to occlude said at least one flow passage in response to said initial surge of liquid.

19. The valve as set forth in claim 18, wherein said surge control device comprises a spring that biases said movable element away from said diffuser.

20. The valve as set forth in claim 18, wherein said movable element comprises first and second wings of a butterfly baffle element, said butterfly baffle element further comprising a base connected to said diffuser, wherein said first and second wings are curled outwardly away from said diffuser and are resiliently deformable into abutment with said diffuser.

\* \* \* \* \*